United States Patent
Zhang et al.

(10) Patent No.: US 11,637,348 B2
(45) Date of Patent: Apr. 25, 2023

(54) COVER ASSEMBLY OF SECONDARY BATTERY AND SECONDARY BATTERY

(71) Applicant: CONTEMPORARY AMPEREX TECHNOLOGY CO., LIMITED, Ningde (CN)

(72) Inventors: Shiyao Zhang, Ningde (CN); Quankun Li, Ningde (CN); Peng Wang, Ningde (CN); Zhanyu Sun, Ningde (CN); Siying Huang, Ningde (CN); Jinmei Xu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 102 days.

(21) Appl. No.: 16/941,419

(22) Filed: Jul. 28, 2020

(65) Prior Publication Data

US 2021/0043902 A1 Feb. 11, 2021

(30) Foreign Application Priority Data

Aug. 7, 2019 (CN) .......................... 201910726079.9

(51) Int. Cl.
*H01M 50/342* (2021.01)
*H01M 50/543* (2021.01)
(Continued)

(52) U.S. Cl.
CPC ..... *H01M 50/342* (2021.01); *H01M 10/0413* (2013.01); *H01M 50/147* (2021.01);
(Continued)

(58) Field of Classification Search
CPC ........... H01M 50/342; H01M 10/0413; H01M 50/147; H01M 50/20; H01M 50/543;
(Continued)

(56) References Cited

U.S. PATENT DOCUMENTS

| 4,131,722 A | 12/1978 | Sugalski |
| 9,070,928 B2 | 6/2015 | Hwang |

(Continued)

FOREIGN PATENT DOCUMENTS

| CN | 1747198 A | 3/2006 |
| CN | 2798318 Y | 7/2006 |

(Continued)

OTHER PUBLICATIONS

Andrey W. Golubkov, Thermal runaway of large automotive Li-ion batteries, 2018, Royal Society of Chemistry (Year: 2018).*

(Continued)

*Primary Examiner* — Maria Laios
*Assistant Examiner* — Bartholomew A Hornsby
(74) *Attorney, Agent, or Firm* — Tucker Ellis LLP

(57) ABSTRACT

A cover assembly of a secondary battery. The cover assembly includes: a cover plate including a gas vent; a gas exhaust valve configured to seal the gas vent and deform in response to an increase in temperature to get out of a state of sealing the gas vent; and a sealing part arranged between the gas exhaust valve and the cover plate and surrounding the gas vent for sealing a gap between the gas exhaust valve and the cover plate.

12 Claims, 9 Drawing Sheets

(51) Int. Cl.
  *H01M 50/578*  (2021.01)
  *H01M 50/20*  (2021.01)
  *H01M 50/147*  (2021.01)
  *H01M 10/04*  (2006.01)

(52) U.S. Cl.
  CPC ......... *H01M 50/20* (2021.01); *H01M 50/543* (2021.01); *H01M 50/578* (2021.01); *H01M 2200/00* (2013.01)

(58) Field of Classification Search
  CPC .......... H01M 50/578; H01M 2200/00; H01M 50/30; H01M 50/325; H01M 50/375
  See application file for complete search history.

(56) References Cited

U.S. PATENT DOCUMENTS

| | | | |
|---|---|---|---|
| 2006/0073375 | A1 | 4/2006 | Hong et al. |
| 2011/0027645 | A1 | 2/2011 | Komatsuki |
| 2015/0236334 | A1* | 8/2015 | Lee ..................... H01M 50/308 429/82 |
| 2015/0364734 | A1* | 12/2015 | Kunoike et al. ...... H01M 4/525 429/55 |
| 2018/0159100 | A1* | 6/2018 | Lee ..................... H01M 50/152 |
| 2018/0159101 | A1* | 6/2018 | Tsang | |

FOREIGN PATENT DOCUMENTS

| | | |
|---|---|---|
| CN | 2904308 Y | 5/2007 |
| CN | 201655859 U | 11/2010 |
| CN | 201673952 U | 12/2010 |
| CN | 202178303 U | 3/2012 |
| CN | 202231080 U | 5/2012 |
| CN | 103474599 A | 12/2013 |
| CN | 103531730 A | 1/2014 |
| CN | 105470431 A | 4/2016 |
| CN | 205177898 U | 4/2016 |
| CN | 205863270 U | 1/2017 |
| CN | 107112473 A | 8/2017 |
| CN | 108500106 A | 9/2018 |
| CN | 109817853 A | 5/2019 |
| CN | 110429214 A | 11/2019 |
| JP | H01311558 A | 12/1989 |
| JP | H0511315 U | 2/1993 |
| JP | H07107836 B2 * | 11/1995 |
| JP | H1064497 A | 3/1998 |
| KR | 100601500 B1 | 12/2005 |
| KR | 100646532 B1 | 9/2006 |
| WO | 2016059618 A1 | 4/2016 |

OTHER PUBLICATIONS

European Search Report from corresponding European Application No. 19208248, dated May 29, 2020, 7 pages.
Chinese Office Action from corresponding Chinese Application No. 201910726079.9, dated May 17, 2021, 17 pages.
Chinese Office Action from corresponding Chinese Application No. 201910726079.9, dated Mar. 15, 2021, 17 pages.
Notice of Allowance from corresponding Chinese Application No. 201910726079.9, dated Nov. 2, 2021; 4 pages with translation.
International Search Report from corresponding International Application No. PCT/CN2020/106462; dated Nov. 2, 2020; 7 pages with translation.

* cited by examiner

C-C

E-E

G-G

H

COVER ASSEMBLY OF SECONDARY BATTERY AND SECONDARY BATTERY

CROSS-REFERENCE TO RELATED APPLICATIONS

The present application claims priority to Chinese Patent Application No. 201910726079.9, filed on Aug. 7, 2019, the content of which is incorporated herein by reference in its entirety.

TECHNICAL FIELD

The present disclosure relates to the technical field of energy storage devices, and in particular, to a cover assembly of a secondary battery and a secondary battery.

BACKGROUND

As an important part of a new energy vehicle, a secondary battery is important in its safety performance. With charging and discharging of the secondary battery, gas will be generated inside the secondary battery. If the gas has a high pressure, the secondary battery may explode. Accordingly, a gas pressure-controlled vent may be provided on a cover plate of the secondary battery.

Since one secondary battery has small capacity or small power, a plurality of secondary batteries is usually provided to form a battery module for use. Once one secondary battery of the battery module experiences thermal runaway, heat generated thereby will be quickly transferred to other secondary batteries of the battery module. Accordingly, the other secondary batteries also experience thermal runaway, thereby causing sharp rise in temperature and gas pressure. When the existing gas pressure-controlled vent experiences thermal runaway, there is a risk that the secondary battery will explode if there is no enough time to release the pressure.

Therefore, it is needed to design a new secondary battery to solve the above problems, so as to improve the safety performance of the secondary battery.

SUMMARY

The present disclosure provides a cover assembly of a secondary battery and a secondary battery that can solve the problem in the related art and improve a safety performance of the secondary battery.

In a first aspect, the present disclosure provides a cover assembly of a secondary battery, including:

a cover plate including a gas vent;

a gas exhaust valve configured to seal the gas vent and deform in response to an increase in temperature to get out of a state of sealing the gas vent;

a sealing part arranged between the gas exhaust valve and the cover plate and surrounding the gas vent for sealing a gap between the gas exhaust valve and the cover plate.

In a possible design, the gas exhaust valve includes a metal sheet and a fixing part, and the metal sheet seals the gas vent;

the sealing part is arranged between the metal sheet and the cover plate for sealing a gap between the metal sheet and the cover plate;

the fixing part is connected to the metal sheet, and the metal sheet is fixed to the cover plate by the fixing part; and the fixing part is configured to deform in response to an increase in temperature in such a manner that the metal sheet gets out of the state of sealing the gas vent.

In a possible design, the fixing part has a melting point within a range of 80° C. to 200° C.

In a possible design, the fixing part includes a main body portion and a connection portion;

the main body portion is connected to a surface of the metal sheet facing away from the sealing part; and along a length direction of the cover assembly, the connection portion is connected to two sides of the main body portion, and the connection portion is connected to the metal sheet.

In a possible design, the connection portion has a ring structure and surrounds a side wall of the metal sheet.

In a possible design, one of the connection portion and the metal sheet is provided with a protrusion, and the other one of the connection portion and the metal sheet is provided with a first groove; and the protrusion matches the first groove.

In a possible design, the main body portion is provided with a first center hole; and the first center hole is opposite to the gas vent.

In a possible design, along a thickness direction of the cover assembly, a projection of the fixing part at least partially overlaps a projection of the sealing part.

In a possible design, the cover assembly further includes a pressing block, and the pressing block is fixed to the cover plate;

the pressing block includes a second center hole, and the second center hole is opposite to the gas vent; and the pressing block presses against a surface of the fixing part facing away from the sealing part, and the fixing part is fixed to the cover plate by the pressing block.

In a possible design, along a thickness direction of the cover assembly, a projection of the pressing block does not overlap a projection of the metal sheet.

In a possible design, the cover plate is provided with a second groove, and the sealing part is at least partially received in the second groove.

In a second aspect, the present disclosure provides a secondary battery, including:

a case including an opening;

an electrode assembly received in the case, the electrode assembly including: a first electrode plate, a second electrode plate, and a separator arranged between the first electrode plate and the second electrode plate; and the cover assembly described above, the cover assembly covering the opening of the case.

A technical solution provided by the present disclosure can achieve the following beneficial effects.

For the cover assembly of the secondary battery and the secondary battery provided by the present disclosure, the gas exhaust valve seals the gas vent, and the gas exhaust valve deforms in response to an increase in temperature to get out of a state of sealing the gas vent. When temperature inside the case of the secondary battery rises, gas inside the case can be exhausted via the gas vent, thereby reducing a risk of thermal runaway of the secondary battery, and also slowing down the thermal runaway of the secondary battery and thus providing passengers with sufficient escape time. Since the sealing part is arranged between the gas exhaust valve and the cover plate and surrounds the gas vent for sealing a gap between the gas exhaust valve and the cover plate, sealing of the gas exhaust valve is improved. This can prevent electrolyte leakage of the secondary battery under a normal operation condition or prevent external water vapor from entering an interior of the case, which would otherwise reduce the safety performance and service life of the secondary battery.

It should be understood that the foregoing general description and the following detailed description are merely exemplary and are not intended to limit the present disclosure.

DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, other drawings can also be acquired by those skilled in the art without paying creative efforts.

Figure 1:
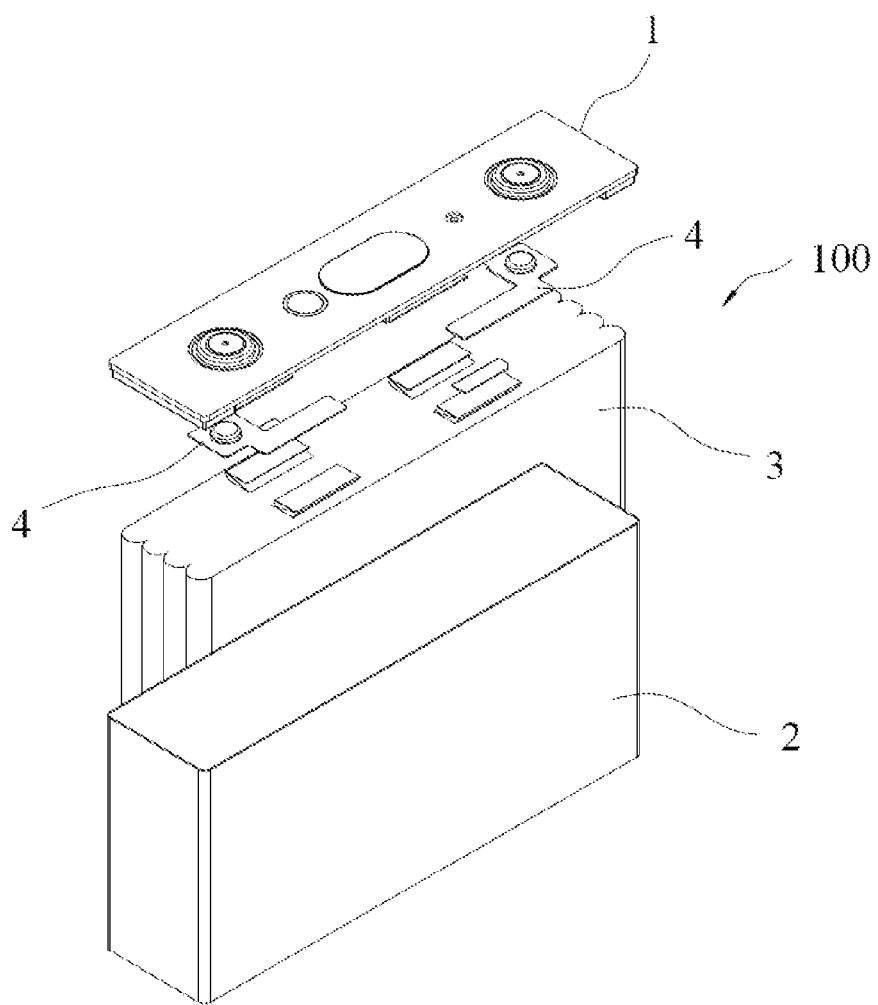
FIG. 1 is a schematic diagram of a structure of a secondary battery according to an embodiment of the present disclosure.

REFERENCE SIGNS 100-secondary battery;
1-cover assembly;
11-cover plate;
111-anti-explosion vent;
112-gas vent;
113-first recess;
114-second recess;
115-second groove;
12-anti-explosion plate;
13-gas exhaust valve;
131-metal sheet;
   131a-protrusion;
132-fixing part;
   132a-main body portion;
   132b-connection portion;
   132c-first groove;
   132d-first center hole;
14-sealing part;
15-pressing block;
151-second center hole;
16-insulation plate;
17-electrode terminal;
2-case;
3-electrode assembly;
4-connection plate.

The drawings herein are incorporated into and constitute a part of the present specification, illustrate embodiments of the present disclosure and explain principles of the present disclosure together with the specification.

DESCRIPTION OF EMBODIMENTS

The technical solutions in the embodiments of the present disclosure are described in the following with reference to the accompanying drawings. It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that, the terms such as "upper", "lower", "left", "right" and the like are used to indicate positions shown in the drawing, instead of being construed as limitations of the embodiment of the present disclosure. In addition, when an element is described as being "on" or "under" another element in the context, it should be understood that the element can be directly or via an intermediate element located "on" or "under" another element.

Figure 2:
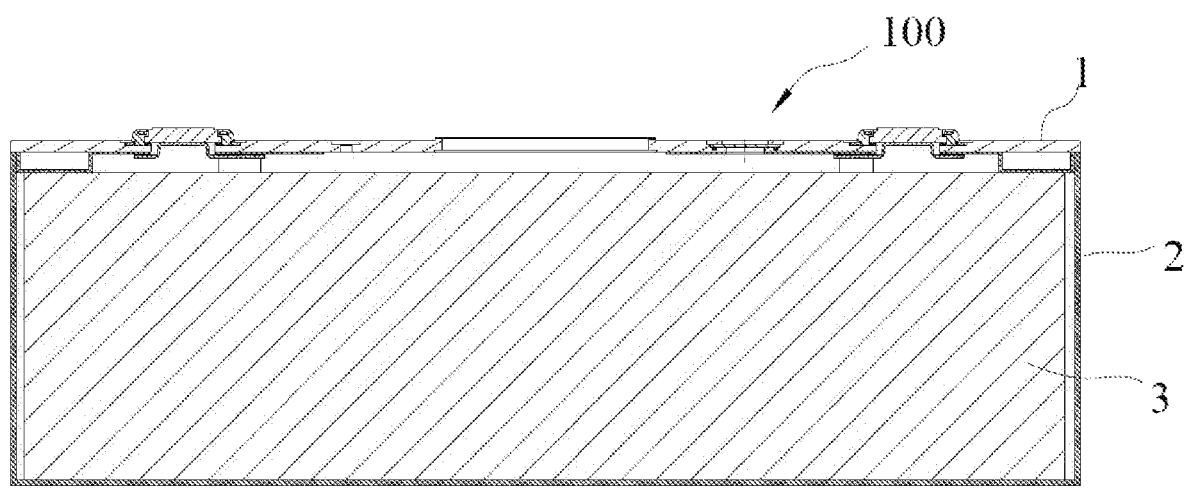
FIG. 2 is a front cross-sectional view illustrating a structure of a secondary battery according to an embodiment of the present disclosure.

FIG. 1 is a schematic diagram of a structure of a secondary battery according to an embodiment of the present disclosure. FIG. 2 is a front cross-sectional view illustrating a structure of a secondary battery according to an embodiment of the present disclosure. As shown in FIG. 1 and FIG. 2, an embodiment of the present disclosure provides a secondary battery 100. The secondary battery 100 includes a case 2, an electrode assembly 3 and a cover assembly 1.

The case 2 may be in a hexahedron shape or other shape. A receiving cavity is formed inside the case 2 for receiving the electrode assembly 3 and an electrolyte. The case 2 is open at its one end, so that the electrode assembly 3 can be placed in the receiving cavity of the case 2 through this opening. A plurality of electrode assemblies 3 may be arranged in the receiving cavity, and the plurality of electrode assemblies 3 is stacked with respect to each other. The case 2 may include a metal material such as aluminum or aluminum alloy, and may further include an insulation material such as plastic.

The electrode assembly 3 includes an electrode unit and tab. The electrode unit includes a negative electrode, a positive electrode, and a separator. The separator is located between a negative electrode and a positive electrode that are adjacent, so as to separate the negative electrode from the positive electrode.

In one embodiment, the negative electrode, the separator, and the positive electrode are sequentially stacked and wound to form the electrode unit of the electrode assembly 3. That is, the electrode unit has a wound structure. In another embodiment, the negative electrode, the separator, and the positive electrode are sequentially stacked to form the electrode unit of the electrode assembly 3, and this electrode unit has a stacked structure. At the same time, the electrode unit includes a slit after being formed, and the electrolyte can enter the electrode unit via the slit to infiltrate the negative electrode and the positive electrode.

The negative electrode includes a negative current collector (for example, a copper foil) and a negative active material layer (for example, carbon or silicon) coated on a surface of the negative current collector. The positive electrode includes a positive current collector (for example, an aluminum foil) and a positive active material layer (for example, a ternary material, lithium iron phosphate or lithium cobaltate) coated on a surface of the positive current collector. A negative electrode tab is connected to the negative electrode and protrudes from the electrode unit. The negative electrode tab may be formed by directly cutting the negative current collector. A positive electrode tab is connected to the positive electrode and protrudes from the electrode unit. The positive electrode tab may be formed by directly cutting the positive current collector.

Figure 3:
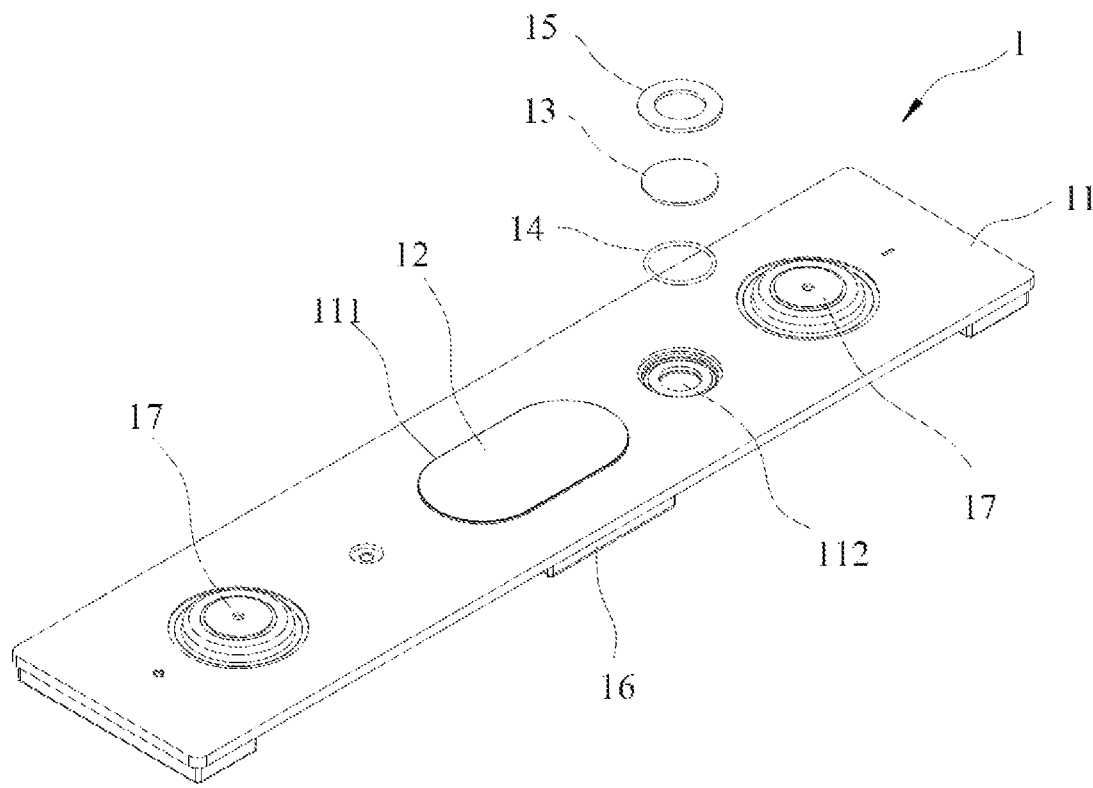
FIG. 3 is an exploded view of a structure of a cover assembly of a secondary battery according to an embodiment of the present disclosure.

FIG. 3 is an exploded view of a structure of a cover assembly of a secondary battery according to an embodiment of the present disclosure. As shown in FIG. 1 to FIG. 3, the cover assembly 1 includes a cover plate 11 and electrode terminals 17. The cover plate 11 is fixed to the opening of the case 2, thereby making the electrode assembly 3 and the electrolyte be enclosed in the receiving cavity of the case 2. The electrode terminals 17 are arranged at the cover plate 11 and include a negative electrode terminal and a positive electrode terminal. The two electrode terminals 17 are electrically connected to respective tabs via connection plates 4. The cover plate 11 is provided with an anti-explosion vent 111, and the anti-explosion plate 12 covers the anti-explosion vent 111.

Specifically, for the secondary battery 100 in which the tabs protrude from a top of the electrode unit, the above-mentioned connection plates 4 are located between the electrode unit of the electrode assembly 3 and the cover plate 11. The connection plates 4 include a negative connection plate and a positive connection plate. The negative connection plate is configured to connect the negative electrode tab with the negative electrode terminal, and the positive connection plate is configured to connect the positive electrode with the positive electrode terminal. The cover assembly 1 further includes an insulation plate 16 that insulates the cover plate 11 from the electrode assembly 3.

The plurality of secondary batteries 100 described above can form a battery module. In the battery module, if one secondary battery experiences thermal runaway, the generated heat will be transferred to an adjacent secondary battery, thereby accelerating thermal runaway of the nearby secondary battery.

Figure 4:
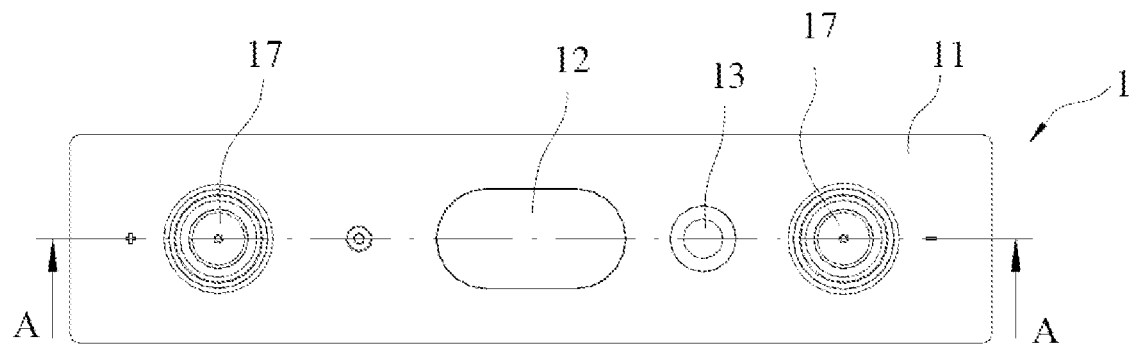
FIG. 4 is a front view of a cover assembly of a secondary battery according to an embodiment of the present disclosure.
Figure 5:
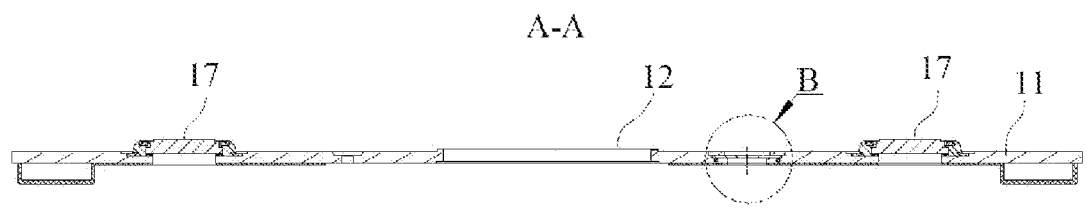
FIG. 5 is a cross-sectional view taken along line A-A of FIG. 4.
Figure 6:
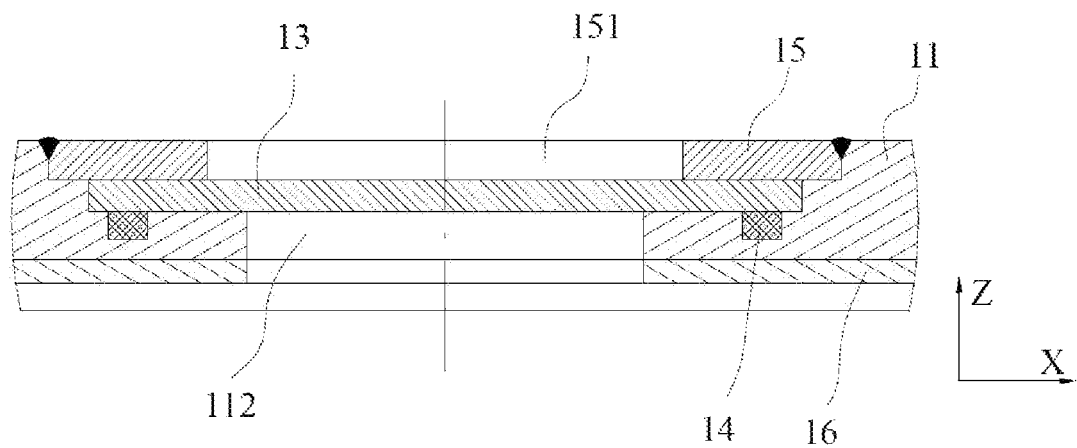
FIG. 6 is an enlarged view of an area B of FIG. 5.

In order to solve this problem, an embodiment of the present disclosure provides a cover assembly 1 of a secondary battery. FIG. 4 is a front view of a cover assembly of a secondary battery according to an embodiment of the present disclosure. FIG. 5 is a cross-sectional view taken along line AA of FIG. 4. FIG. 6 is an enlarged view of an area B of FIG. 5. As shown in FIG. 3 to FIG. 6, the cover assembly 1 includes a cover plate 11, a gas exhaust valve 13, and a sealing part 14.

The cover plate 11 includes a gas vent 112. The gas exhaust valve 13 seals the gas vent 112, and the gas exhaust valve 13 deforms in response to an increase in temperature in such a manner that the gas exhaust valve 13 no longer seals the gas vent 112. A sealing part 14 is arranged between the gas exhaust valve 13 and the cover plate 11 and surrounds the gas vent 112, so as to seal a gap between the gas exhaust valve 13 and the cover plate 11.

In this embodiment, the cover assembly 1 seals the gas vent 112 by the gas exhaust valve 13, and the gas exhaust valve 13 deforms in response to an increase in temperature in such a manner that the gas exhaust valve 13 no longer seals the gas vent 112. When temperature inside the case 2 of the secondary battery 100 rises, the gas exhaust valve13 no longer seals the gas vent 112, so that the gas inside the case 2 can be exhausted via the gas vent 112. In this way, on the one hand, the pressure inside the case 2 can be reduced so as to prevent explosion of the secondary battery 100, and on the other hand, partial heat can be taken away by exhausting gas so as to slow down the thermal runaway of the secondary battery 100 and provide sufficient escape time for passengers.

Since the sealing part 14 is arranged between the gas exhaust valve 13 and the cover plate 11 and surrounds the gas vent 112 so that the sealing part 14 seals the gap between the gas exhaust valve 13 and the cover plate 11, sealing of the gas exhaust valve 13 is improved. This can prevent electrolyte leakage of the secondary battery 100 under or prevent external water vapor from entering an interior of the case 2 a normal operation condition, which would otherwise reduce the safety performance and service life of the secondary battery 100.

In an implementation, the gas exhaust valve 13 has a lower melting point than the cover plate 11. For example, the gas exhaust valve 13 may be formed by a material of PP (polypropylene), PE (polyethylene) or the like. When the temperature inside the case 2 exceeds the melting point of the gas exhaust valve 13, the gas exhaust valve 13 will deform, that is, melting or softening occurs. At this time, the gas exhaust valve 13 will get out of a state of sealing the gas vent 112, so that the gas vent 112 is open and thus the gas inside the case 2 of the secondary battery 100 can be exhausted to an exterior of the case 2 via the gas vent 112.

In an implementation, the cover assembly 1 may further include a pressing block 15. Along a thickness direction Z of the cover assembly, the pressing block 15 presses against the gas exhaust valve 13. The pressing block 15 may be welded to the cover plate 11, so that the gas exhaust valve 13 is fixed to the cover plate 11.

Figure 7:
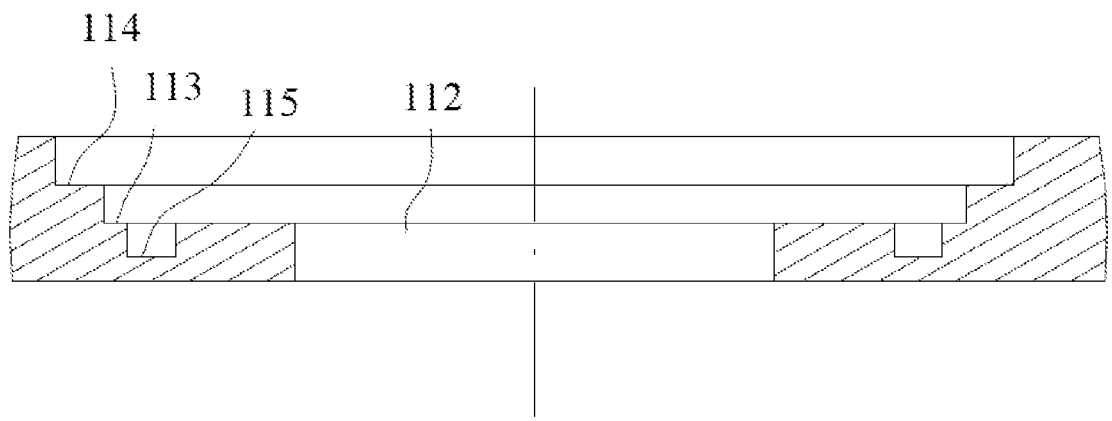
FIG. 7 is a partial view of a structure of a cover plate shown in FIG. 6.

FIG. 7 is a partial view of a structure of a cover plate shown in FIG. 6. In an implementation, the cover plate 11 includes a first recess 113 and a second recess 114. With reference to FIG. 6 and FIG. 7, along the thickness direction Z of the cover assembly 1, the first recess 113 is located above the gas vent 112 and the second recess 114 is located above the first recess 113. An inner diameter of the first recess 113 is larger than a diameter of the gas vent 112, and an inner diameter of the second recess 114 is larger than the inner diameter of the first recess 113. The gas exhaust valve 13 is received in the first recess 113, and the pressing block 15 is received in the second recess 114.

With the first recess 113 and the second recess 114, a top surface of the pressing block 15 is substantially aligned with a top surface of the cover plate 11, so that the pressing block 15 and the gas exhaust valve 13 do not occupy too much space, thereby increasing an energy density of the secondary battery.

In an implementation, the cover plate 11 is provided with a second groove 115, and the sealing part 14 is received in the second groove 115. When the cover plate 11 is provided with the second groove 115 and the sealing part 14 is at least partially received in the second groove 115, the sealing part 14 is in contact with a bottom of the second groove 115 and the gas exhaust valve 13. In this way, the sealing of the gas exhaust valve 13 is improved. Moreover, with the second groove 115, a space occupied by the cover assembly 1 in the thickness direction Z can be reduced, thereby increasing the energy density of the secondary battery 100.

In an implementation, the second groove 115 is located at an upper surface of the cover plate 11 at a circumference of the gas vent 112, and a lower surface of the gas exhaust valve 13 matches the sealing part 14 in the second groove 115. Specifically, the second groove 115 may be formed at a bottom surface of the first recess 113, and the second groove 115 may also be formed at other position of the cover plate 11.

In an implementation, the second groove 115 is located at a lower surface of the cover plate 11 at the circumference of the gas vent 112, and an upper surface of the gas exhaust valve 13 matches the sealing part 14 in the second groove 115.

In an implementation, the second groove 115 is located at a pore wall at the circumference of the gas vent 112, and a circumferential outer surface of the gas exhaust valve 13 matches the sealing part 14 in the second groove 115.

Another exemplary embodiment will be described in the following, in which the elements that are the same as those in the above exemplary embodiments will not be further described herein, and only dissimilar elements will be described in detail.

Figure 8:
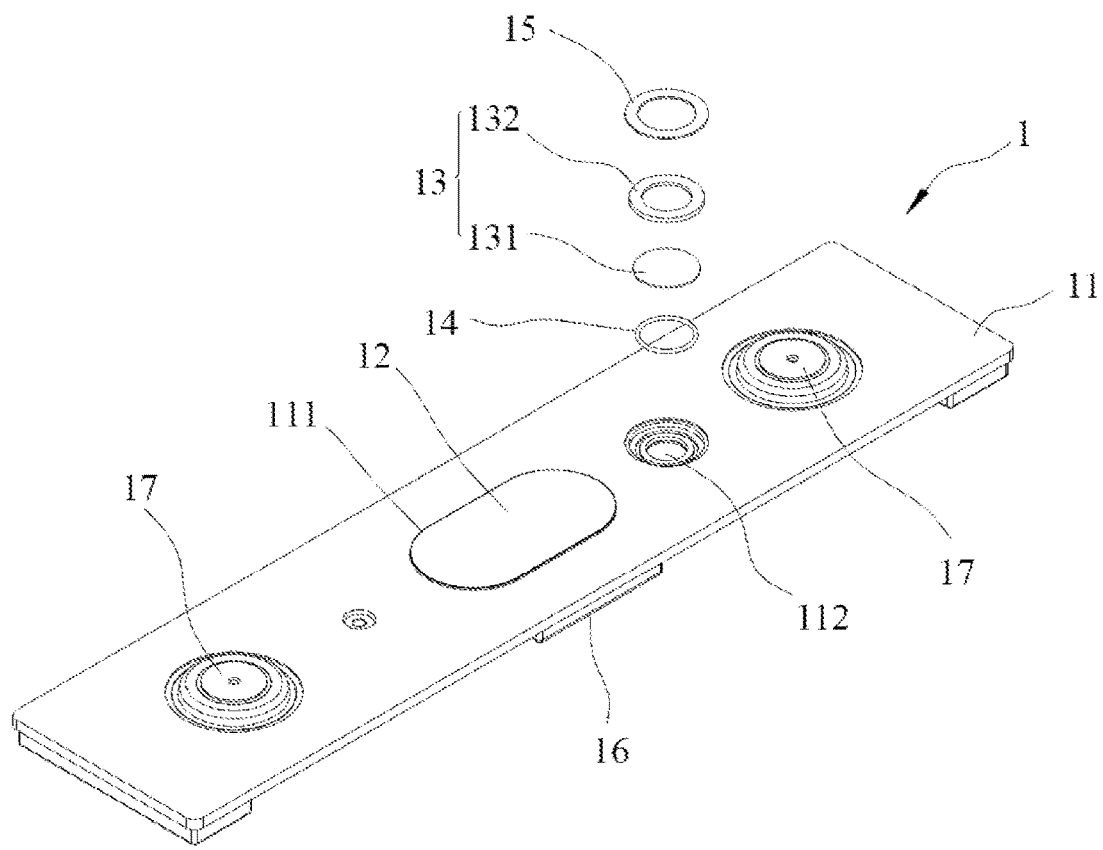
FIG. 8 is an exploded view of a structure of a cover assembly of a secondary battery according to another embodiment of the present disclosure.
Figure 9:
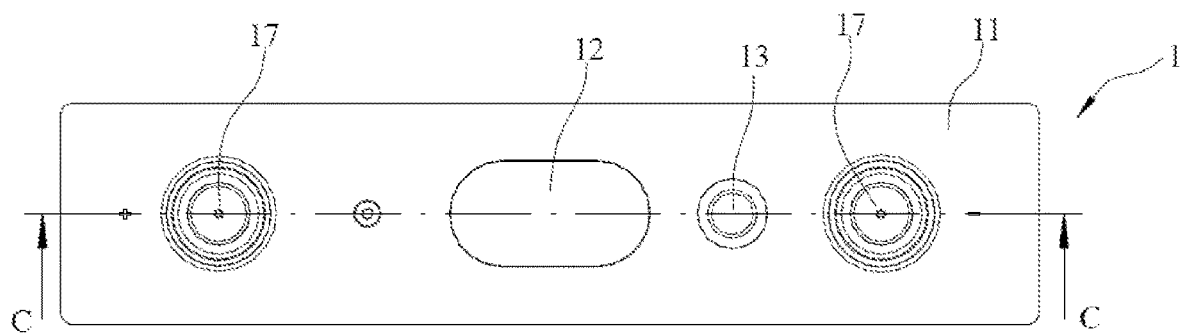
FIG. 9 is a front view of a cover assembly of a secondary battery according to another embodiment of the present disclosure.
Figure 10:
FIG. 10 is a cross-sectional view taken along line C-C of FIG. 9.
Figure 11:
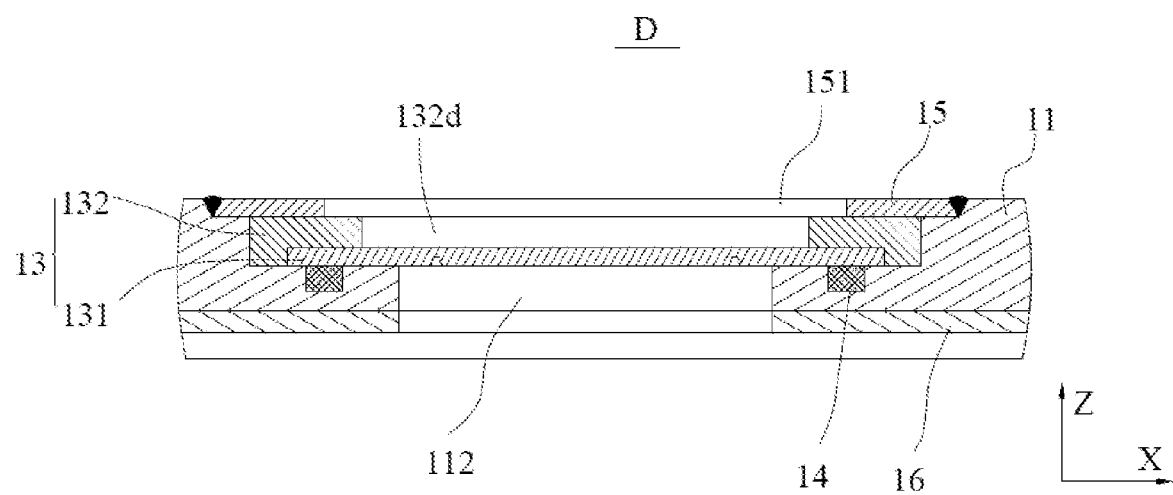
FIG. 11 is an enlarged view of an area D of FIG. 10.
Figure 12:
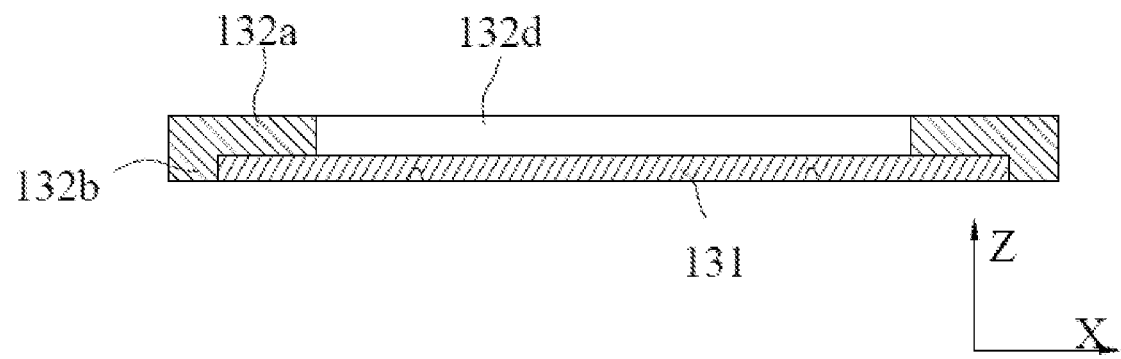
FIG. 12 is a schematic view of a structure of a gas exhaust valve shown in FIG. 11.

FIG. 8 is an exploded view of a structure of a cover assembly of a secondary battery according to another embodiment of the present disclosure. FIG. 9 is a front view of a cover assembly of a secondary battery according to another embodiment of the present disclosure. FIG. 10 is a cross-sectional view taken along line C-C of FIG. 9. FIG. 11 is an enlarged view of an area D of FIG. 10. FIG. 12 is a schematic view of a structure of a gas exhaust valve shown in FIG. 11.

As shown in FIG. 8 to FIG. 12, in a possible implementation manner, the gas exhaust valve 13 includes a metal sheet 131 and a fixing part 132, and the metal sheet 131 seals the gas vent 112. The sealing part 14 is arranged between the metal sheet 131 and the cover plate 11 for sealing a gap between the metal sheet 131 and the cover plate 11. The fixing part 132 is connected to the metal sheet 131, and the metal sheet 131 is fixed to the cover plate 11 by the fixing part 132. The fixing part 132 deforms in response to an increase in temperature, so as to make the metal sheet 131 get out of a state of sealing the gas vent 112.

In an implementation, the metal sheet may be an aluminum sheet, a stainless steel sheet or a nickel sheet, preferably an aluminum sheet, which has advantages of light weight and good penetration resistance.

The fixing part 132 has a lower melting point than the cover plate 11. For example, the fixing part 132 may be made of PP (polypropylene), PE (polyethylene) or the like. When the temperature inside the case 2 exceeds the melting point of the fixing part 132, the fixing part 132 will deform, that is, melting or softening occurs. At this time, the metal sheet 131 moves with the deformation of the fixing part 132, thereby getting out of a state of sealing the gas vent 112. In this case, the gas vent 112 is open, and the gas inside the case 2 of the secondary battery 100 can be exhausted to an exterior via the gas vent 112. Illustratively, the melting point of the fixing part 132 may be within a range of 80° C. to 200° C.

The sealing part 14 may be an annular sealing ring, and the annular sealing ring is arranged between the metal sheet 131 and the cover plate 11 and is in contact with the metal sheet 131 and the cover plate 11, thereby ensuring the sealing between the metal sheet 131 and the gas vent 112.

The above-described gas exhaust valve 13 includes a metal sheet 131. Since the metal sheet 131 has a better penetration resistance, it can prevent the electrolyte in the case 2 of the secondary battery 100 from penetrating to the exterior of the case 2, and also prevent moisture or other gas outside the case 2 from penetrating into the case 2, which would otherwise reduce the service life of the secondary battery 100. With the fixing part 132, rigidity of the entire gas exhaust valve 13 can be increased, so that the gas exhaust valve 13 does not undergo a big deformation when pressure is applied to the sealing part 14.

In an implementation, as shown in FIG. 11 and FIG. 12, the fixing part 132 includes a main body portion 132a and a connection portion 132b. The main body portion 132a is connected to a surface of the metal sheet 131 facing away from the sealing part 14. Along a length direction X of the cover assembly 1, the connection portion 132b is connected to two sides of the main body portion 132a, and the connection portion 132b is connected to the metal sheet 131.

The metal sheet 131 is connected to the cover plate 11 via the above-described connection portion 132b. Specifically, the main body portion 132a, the connection portion 132b, and the metal sheet 131 may be formed by injection molding. With the connection portion 132b, reliability of a connection between the metal sheet 131 and the cover plate 11 is improved, and the above-described pressing block 15 can press against the main body portion 132a.

In an implementation, the connection portion 132b has a ring structure and surrounds a side wall of the metal sheet 131. With the connection portion 132b having a ring structure and surrounding the side wall of the metal sheet 131, strength of a connection between the fixing part 132 and the metal sheet 131 can be further increased, and the fixing part 132 can more uniformly and comprehensively sense a temperature change inside the case 2. Once the temperature inside the case 2 is extremely high, the connection portion 132b will melt and deform, thereby causing the metal sheet 131 to get out of a state of sealing the gas vent 112.

In an implementation, the main body portion 132a is provided with a first center hole 132d, and the first center hole 132d is opposite to the gas vent 112. When the temperature inside the case 2 of the secondary battery 100 rises to a preset value (a threshold value set based on a temperature at which thermal runaway occurs), the connection portion 132b melts or deforms, and the metal sheet 131 accordingly moves or deforms. The first center hole 132d is opposite to the gas vent 112, that is, a center of the first center hole 132d substantially corresponds to a center of the metal sheet 131. In this way, the binding of the fixing part 132 to the metal sheet 131 is reduced, thereby reducing hindrance to movement or deformation of the metal sheet 131.

Another exemplary embodiment will be described in the following, in which the elements that are the same as those in the above exemplary embodiments will not be further described herein, and only dissimilar elements will be described in detail.

Figure 13:
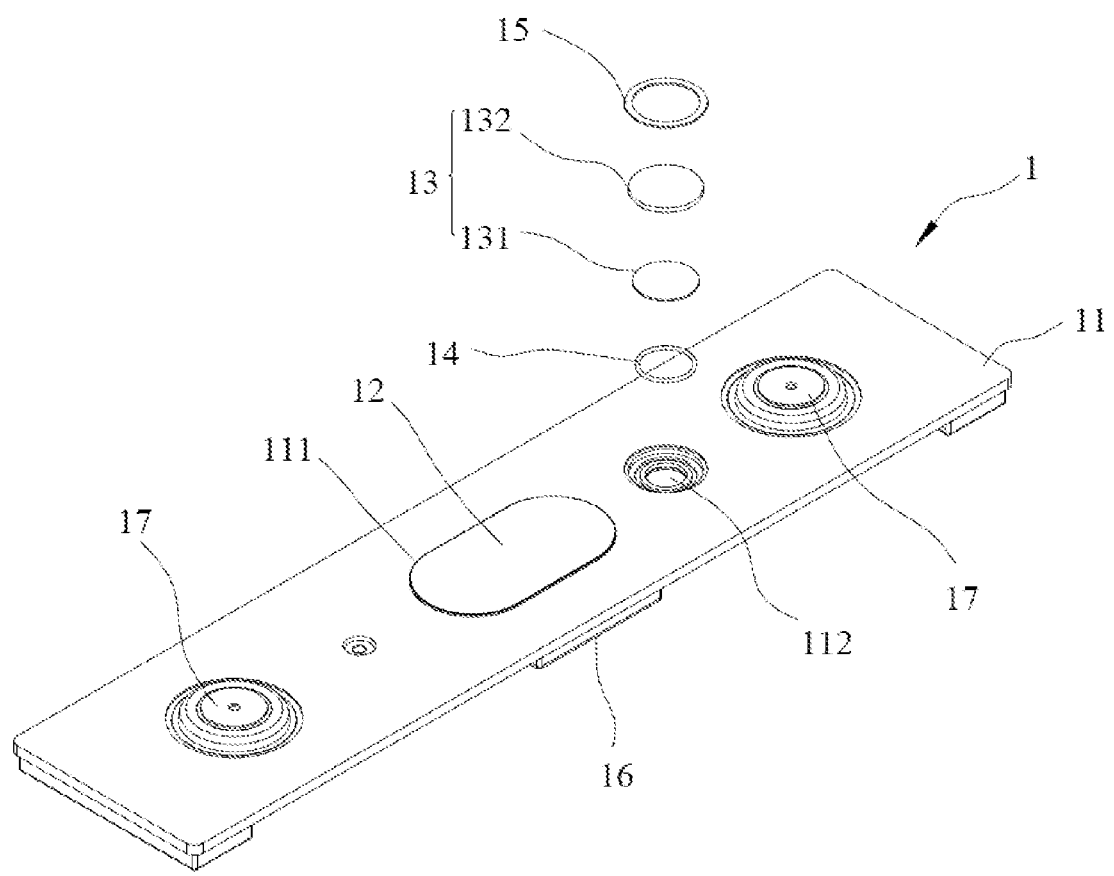
FIG. 13 is an exploded view of a structure of a cover assembly of a secondary battery according to still another embodiment of the present disclosure.
Figure 14:
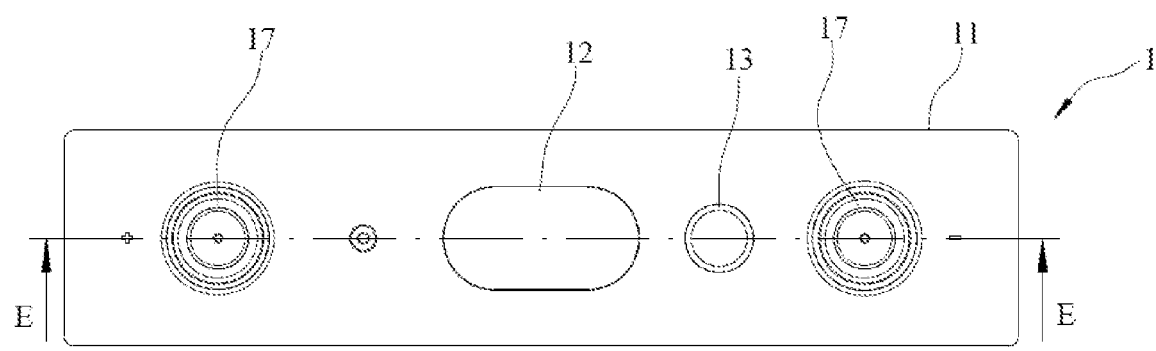
FIG. 14 is a front view of a cover assembly of a secondary battery according to still another embodiment of the present disclosure.
Figure 15:
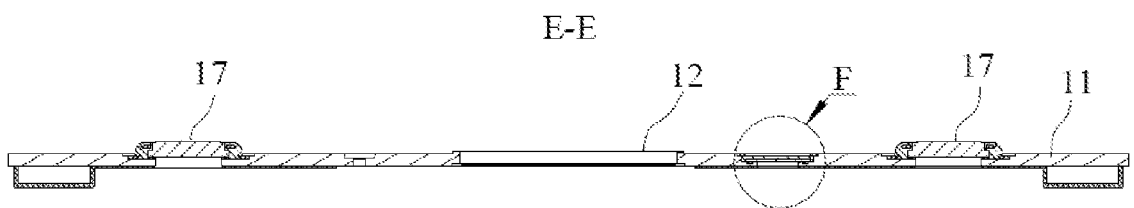
FIG. 15 is a cross-sectional view taken along line E-E of FIG. 14.
Figure 16:
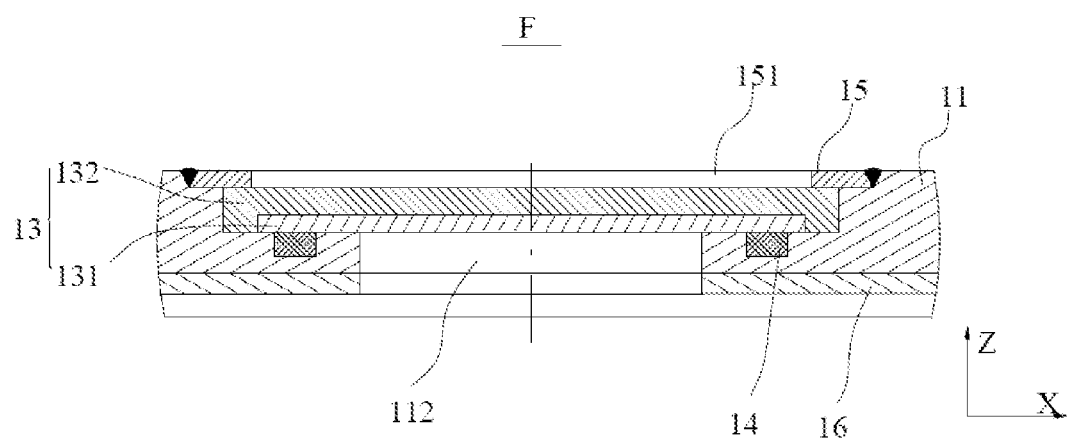
FIG. 16 is an enlarged view of an area F of FIG. 15.
Figure 17:
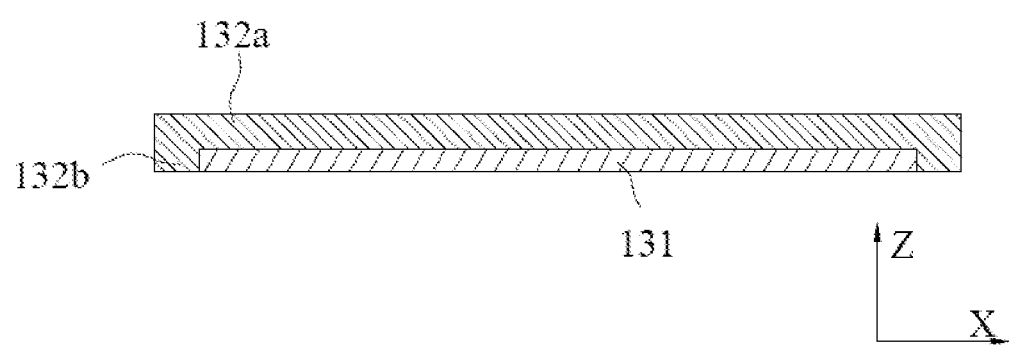
FIG. 17 is a schematic view of a structure of a gas exhaust valve shown in FIG. 16.

FIG. 13 is an exploded view of a structure of a cover assembly of a secondary battery according to still another embodiment of the present disclosure. FIG. 14 is a front view of a cover assembly of a secondary battery according to still another embodiment of the present disclosure. FIG. 15 is a cross-sectional view taken along line E-E of FIG. 14. FIG. 16 is an enlarged view of an area F of FIG. 15. FIG. 17 is a schematic view of a structure of a gas exhaust valve shown in FIG. 16, As shown in FIG. 13 to FIG. 17, in an implementation, the main body portion 132a may not be provided with the first center hole 132d, but may be integrally connected to a side of the metal sheet 131 facing away from the sealing part 14.

In an implementation, along the thickness direction Z of the cover assembly 1, a projection of the fixing part 132 at least partially overlaps a projection of the sealing part 14. As described above, with the fixing part 132, an overall rigidity of the gas exhaust valve 13 is increased. When the metal sheet 131 presses against the sealing part 14, if the fixing part 132 cannot at least partially cover the sealing part 14, the metal sheet 131 will deform, thereby affecting a sealing effect thereof. Thus, the projection of the setting fixing part 132 at least partially overlaps the projection of the sealing part 14, so that the overall rigidity of the gas exhaust valve 13 is increased and the pressure on the sealing part 14 is increased, thereby ensuring the sealing of the secondary battery 100.

In an implementation, along the thickness direction Z of the cover assembly 1, the projection of the sealing part 14 is totally within the projection of the fixing part 132.

In an implementation, the cover assembly 1 further includes a pressing block 15, and the pressing block 15 is fixed to the cover plate 11. The pressing block 15 includes a second center hole 151, and the second center hole 151 is opposite to the gas vent 112. The pressing block 15 presses against a surface of the fixing part 132 facing away from the sealing part 14, and the fixing part 132 is fixed to the cover plate 11 by the pressing block 15.

The pressing block 15 presses against the fixing part 132 of the gas exhaust valve 13, and the pressing block 15 may be welded to the cover plate 11, so that the gas exhaust valve 13 is fixed to the gas vent 112.

When the secondary battery 100 is about to experience thermal runaway, if the pressing block 15 applies an excessive pressure onto the metal sheet 131, deformation of the metal sheet 131 will be affected, thereby resulting in untimely gas exhaust. With the second center hole 151, the pressing block 15 does not apply an excessive pressure onto the metal sheet 131.

In an implementation, along the thickness direction Z of the cover assembly 1, a projection of the pressing block 15 does not overlap a the projection of the metal sheet 131. In other words, along the thickness direction Z of the cover assembly 1, the projection of the metal sheet 131 does not totally fall within the second center hole 151 described above. When the secondary battery is about to experience thermal runaway, a temperature of the gas inside the case 2 will cause the fixing part 132 to melt or deform, and the metal sheet 131 is separated from the gas vent 112. Under an impact of the gas, the metal sheet 131 leaves the cover assembly 1 of the secondary battery 100 via the second center hole 151. With the projection of the pressing block 15 not overlapping the projection of the metal sheet 131, after the fixing part 132 melts or deforms, the pressing block 15 does not block the metal sheet 131, so that the metal sheet 131 falls to the exterior of the case 2 of the secondary battery instead of falling to the interior of the case 2 of the secondary battery100. This ensures the safety performance of the secondary battery 100.

Another exemplary embodiment will be described in the following, in which the elements that are the same as those in the above exemplary embodiments will not be further described herein, and only dissimilar elements will be described in detail.

Figure 18:
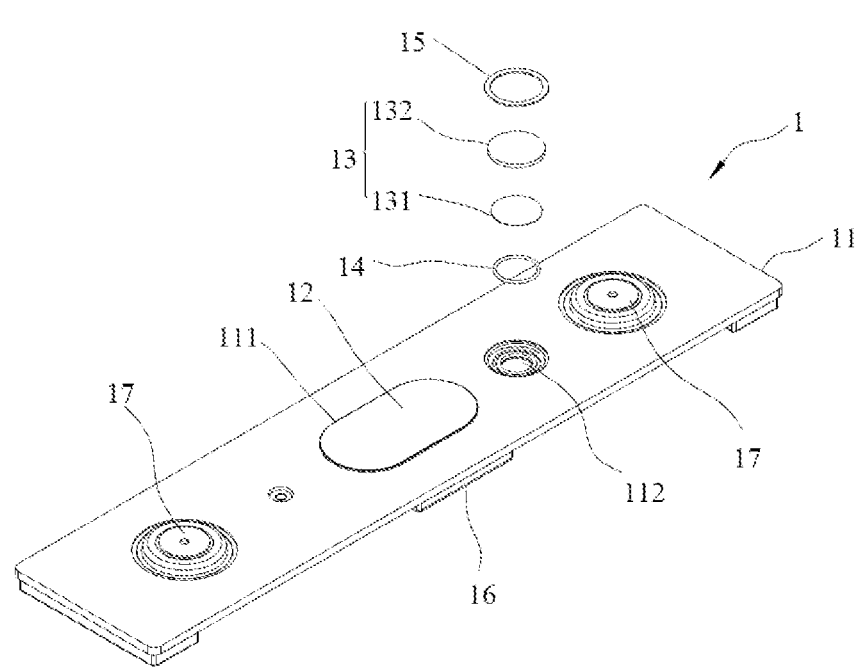
FIG. 18 is an exploded view of a structure of a cover assembly of a secondary battery according to yet another embodiment of the present disclosure.
Figure 19:
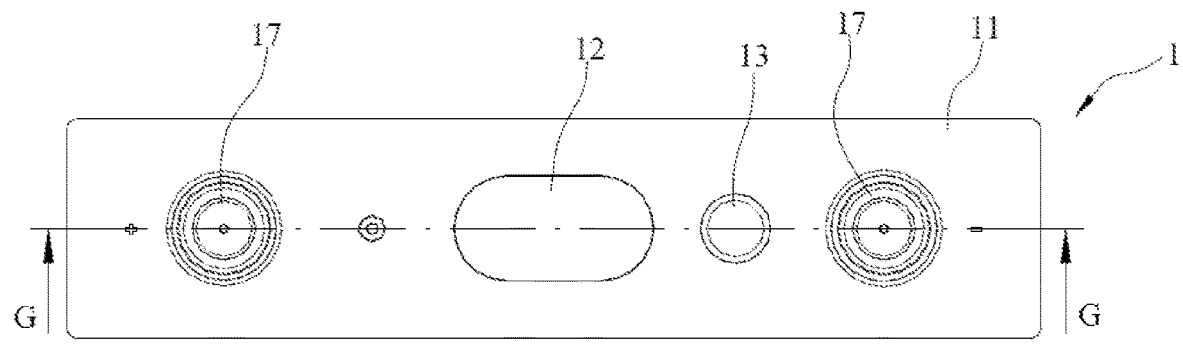
FIG. 19 is a front view of a cover assembly of a secondary battery according to yet another embodiment of the present disclosure.
Figure 20:
FIG. 20 is a cross-sectional view taken along line G-G of FIG. 19.
Figure 21:
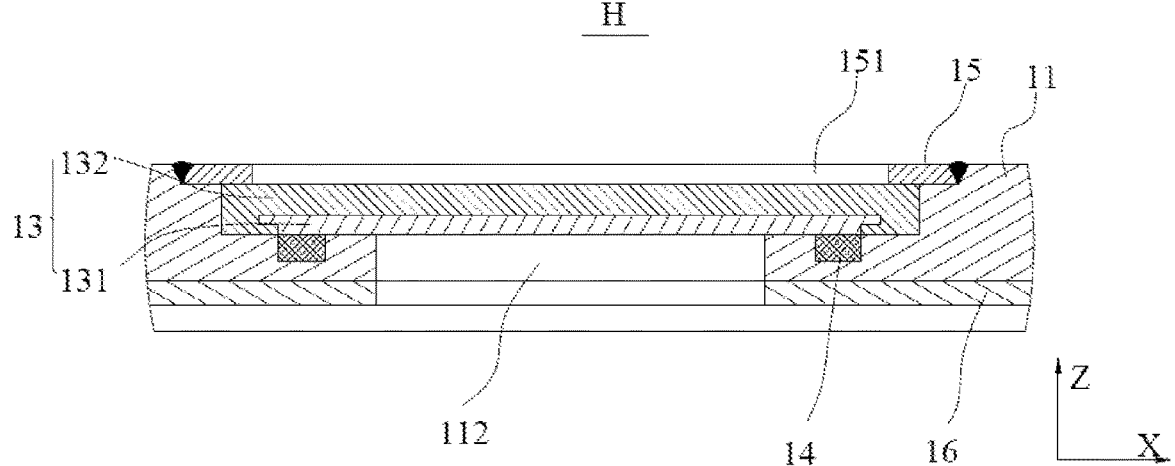
FIG. 21 is an enlarged view of an area H of FIG. 20.
Figure 22:
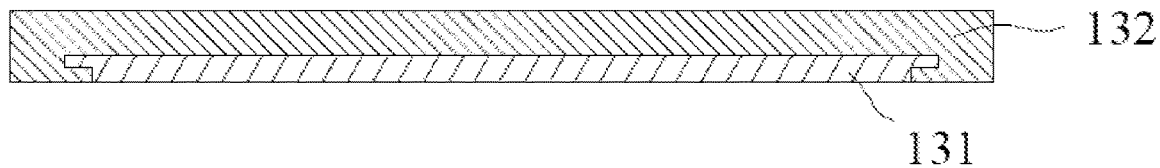
FIG. 22 is a schematic view of a structure of a gas exhaust valve shown in FIG. 21.
Figure 23:
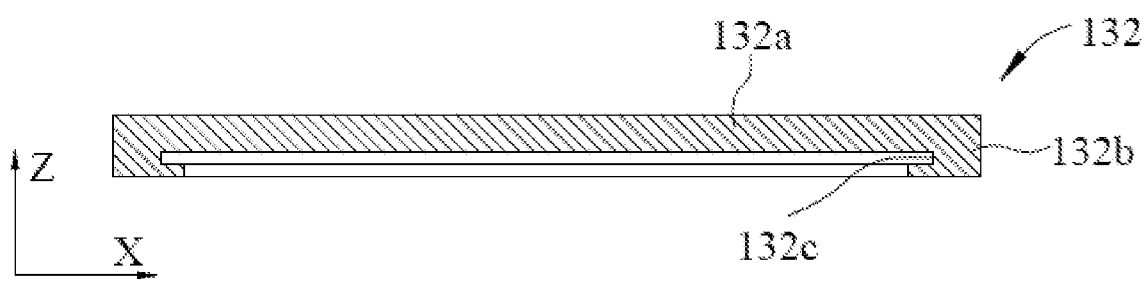
FIG. 23 is a schematic view of a structure of a fixing part shown in FIG. 22.
Figure 24:
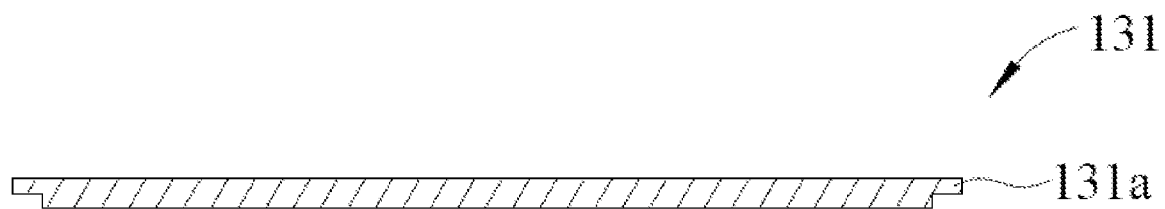
FIG. 24 is a schematic view of a structure of a metal sheet shown in FIG. 22.

FIG. 18 is an exploded view of a structure of a cover assembly of a secondary battery according to yet another embodiment of the present disclosure. FIG. 19 is a front view of a cover assembly of a secondary battery according to yet another embodiment of the present disclosure. FIG. 20 is a cross-sectional view taken along line G-G of FIG. 19. FIG. 21 is an enlarged view of an area H of FIG. 20. FIG. 22 is a schematic view of a structure of a gas exhaust valve shown in FIG. 21. FIG. 23 is a schematic view of a structure of a fixing part shown in FIG. 22. FIG. 24 is a schematic view of a structure of a metal sheet shown in FIG. 22.

As shown in FIG. 18 to FIG. 24, in an implementation, one of the connection portion 132b and the metal sheet 131 is provided with a protrusion 131a, and the other one of the connection portion 132b and the metal sheet 131 is provided with a first groove 132c. The protrusion 131a matches the first groove 132c. In this embodiment, the metal sheet 131 is provided with the protrusion 131a, and the connection portion 132b is provided with the first groove 132c. With the first groove 132c matching the protrusion 131a, strength of a connection between the metal sheet 131 and the connection portion 132b can be further improved. Moreover, with the first groove 132c, both a top surface and a bottom surface of the protrusion 131a of the metal sheet 131 are covered by the connection portion 132b. In this case, when the secondary battery 100 is not in thermal runaway, the metal sheet 131 does not deform easily.

In the embodiment shown in FIG. 18 to FIG. 24, along the thickness direction Z of the cover assembly 1, the projection of the pressing block 15 does not overlap the projection of the metal sheet 131. After the fixing part 132 melts or deforms, the pressing block 15 does not block the metal sheet 131, so that the metal sheet 131 drops to the exterior of the case 2 of the secondary battery instead of falling to the interior of the case 2 of the secondary battery 100. This can ensure the safety performance of the secondary battery 100.

An embodiment of the present disclosure further provides a secondary battery 100, including the case 2, the electrode assembly 3, and the cover assembly 1 provided by any embodiment of the present disclosure. The case 2 includes an opening, and the electrode assembly 3 is received in the case 2. The electrode assembly 3 includes a first electrode plate, a second electrode plate, and a separator arranged between the first electrode plate and the second electrode plat. The cover assembly 1 covers the opening of the case 2, so as to make the electrode assembly 3 be enclosed in the case 2.

In summary, for the cover assembly 1 of the secondary battery 100 and the secondary battery provided by the embodiments of the present disclosure, when one secondary battery is in thermal runaway, with the increasing of the temperature of the gas temperature inside the case 2, the gas vent 112 is opened by an adjacent secondary battery through the gas exhaust valve 13, thereby releasing gas pressure to reduce a possibility of explosion. This can also take away some heat, thereby slowing down the thermal runaway and providing the passengers with escape time.

The above-described embodiments are merely preferred embodiments of the present disclosure and are not intended to limit the present disclosure. Various changes and modifications can be made to the present disclosure by those skilled in the art. Any modifications, equivalent substitutions and improvements made within the principle of the present disclosure shall fall into the protection scope of the present disclosure.

What is claimed is:

1. A cover assembly of a secondary battery, comprising:
   a cover plate comprising a gas vent;
   a gas exhaust valve configured to seal the gas vent and deform in response to an increase in temperature to get out of a state of sealing the gas vent in such a manner that gas inside a case of the secondary battery is directly exhausted to an exterior of the secondary battery via only the gas vent; and
   a sealing part arranged between the gas exhaust valve and the cover plate and surrounding the gas vent for sealing a gap between the gas exhaust valve and the cover plate,
   wherein an orthographic projection of the sealing part on the cover plate does not overlap with an orthographic projection of the gas vent on the cover plate;
   the gas exhaust valve comprises a metal sheet and a fixing part, and the metal sheet seals the gas vent;
   the sealing part is arranged between the metal sheet and the cover plate for sealing a gap between the metal sheet and the cover plate;
   the fixing part is connected to the metal sheet, and the metal sheet is fixed to the cover plate by the fixing part; and
   the fixing part is configured to deform in response to an increase in temperature in such a manner that the metal sheet gets out of the state of sealing the gas vent.

2. The cover assembly according to claim 1, wherein the fixing part has a melting point within a range of 80° C. to 200° C.

3. The cover assembly according to claim 1, wherein the fixing part comprises a main body portion and a connection portion;
   the main body portion is connected to a surface of the metal sheet facing away from the sealing part; and
   along a length direction of the cover assembly, the connection portion is connected to two sides of the main body portion, and the connection portion is connected to the metal sheet.

4. The cover assembly according to claim 3, wherein the connection portion has a ring structure and surrounds a side wall of the metal sheet.

5. The cover assembly according to claim 3, wherein one of the connection portion and the metal sheet is provided with a protrusion, and the other one of the connection portion and the metal sheet is provided with a first groove; and
   the protrusion matches the first groove.

6. The cover assembly according to claim 3, wherein the main body portion is provided with a first center hole; and
   the first center hole is opposite to the gas vent.

7. The cover assembly according to claim 1, wherein along a thickness direction of the cover assembly, a projection of the fixing part at least partially overlaps a projection of the sealing part.

8. The cover assembly according to claim 1, wherein the cover assembly further comprises a pressing block, and the pressing block is fixed to the cover plate;
   the pressing block comprises a second center hole, and the second center hole is opposite to the gas vent;
   the pressing block presses against a surface of the fixing part facing away from the sealing part, and the fixing part is fixed to the cover plate by the pressing block; and
   an orthograph projection of the second center hole on the cover plate overlaps with the orthographic projection of the gas vent on the cover plate.

9. The cover assembly according to claim 8, wherein along a thickness direction of the cover assembly, a projection of the pressing block does not overlap a projection of the metal sheet.

10. The cover assembly according to claim 1, wherein the cover plate is provided with a second groove, and the sealing part is at least partially received in the second groove.

11. A secondary battery, comprising:
    a case comprising an opening;
    an electrode assembly received in the case, wherein the electrode assembly comprises a first electrode plate, a second electrode plate, and a separator arranged between the first electrode plate and the second electrode plate; and
    the cover assembly according to claim 1, wherein the cover assembly covers the opening of the case.

12. The cover assembly according to claim 1, wherein the fixing part is in a shape of a plate and is integrally connected to a side of the metal sheet facing away from the sealing part.

* * * * *